Apr. 10, 1923.  
A. GILSON  
LOCK FOR MOTOR VEHICLES  
Filed June 1, 1920  
1,451,039  
2 sheets-sheet 1
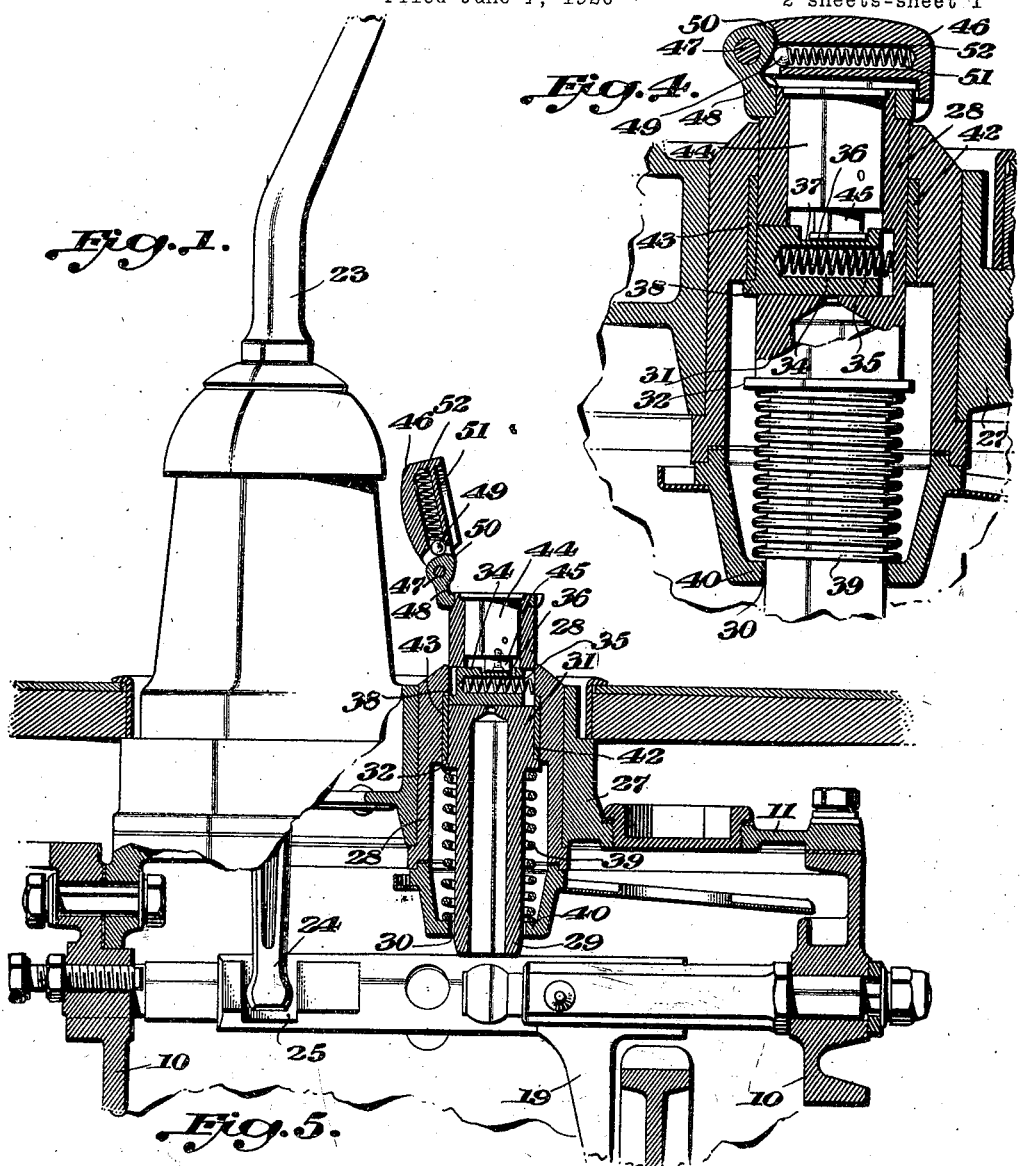
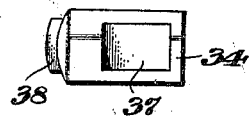
Inventor:
Ara Gilson,
By Milton Tibbetts
Atty.

Apr. 10, 1923.  1,451,039
A. GILSON
LOCK FOR MOTOR VEHICLES
Filed June 1, 1920  2 sheets-sheet 2

Inventor,
Ara Gilson,
By Milton Tibbetts
Atty.

Patented Apr. 10, 1923.

1,451,039

UNITED STATES PATENT OFFICE.

ARA GILSON, OF DETROIT, MICHIGAN, ASSIGNOR TO PACKARD MOTOR CAR COMPANY, OF DETROIT, MICHIGAN, A CORPORATION OF MICHIGAN.

LOCK FOR MOTOR VEHICLES.

Application filed June 1, 1920. Serial No. 385,465.

*To all whom it may concern:*

Be it known that I, ARA GILSON, a citizen of the United States, and resident of Detroit, Wayne County, State of Michigan, have invented certain new and useful Improvements in Locks for Motor Vehicles, of which the following is a specification.

This invention relates to motor vehicles, and particularly to means for locking the gear shifting mechanism of such vehicles against movement.

The invention in the embodiment to be described is particularly adapted for use in connection with the type of gear shifting mechanism in which the gears are controlled by longitudinally shiftable elements arranged substantially parallel to each other.

The invention has for its object to provide means for securely locking the shiftable elements of the gear shifting mechanism against movement and further to provide a construction which may be easily and readily actuated and may also be easily released.

Further objects will appear from the following specification taken in connection with the drawings which form a part thereof and in which:

Fig. 1 is a vertical, sectional view illustrating the locking mechanism and showing the shifting lever in side elevation;

Fig. 4 is an enlarged sectional view showing the locking member in locking position; and Figs. 5, 6, and 7 are enlarged, detail views illustrating in plan, section, and end elevation the construction of the latch member.

Figure 2:
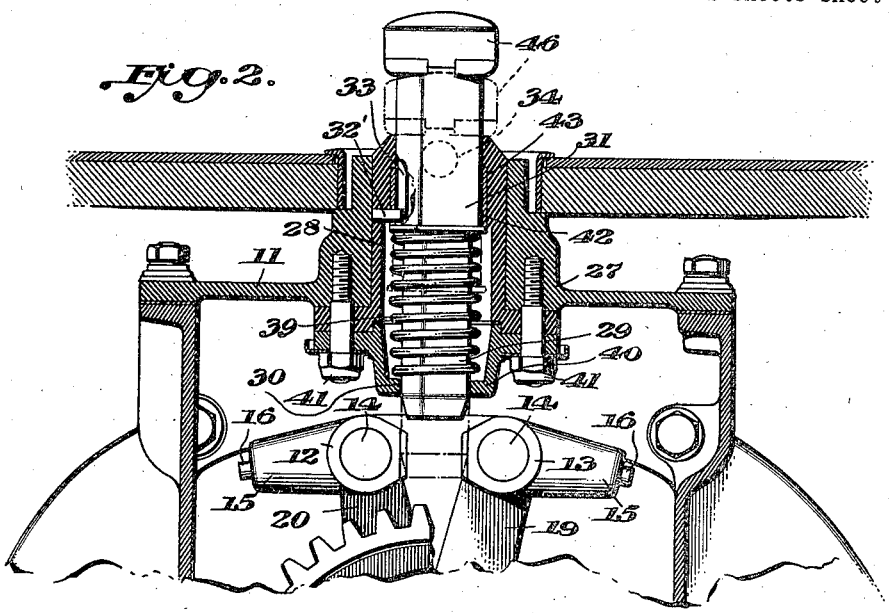
Fig. 2 is a transverse sectional view taken through the locking mechanism.

Turning now to the drawings, I have shown in Fig. 1, a portion of the gear casing for housing the transmission gear mechanism of a motor vehicle, the end walls being shown at 10 and the cover for the casing being shown at 11.

The gear shifting elements comprise a pair of tubular, longitudinally shiftable rods 12 and 13, these rods being slidably mounted in substantially parallel relation with respect to each other on supporting bars 14, the latter being suitably supported on the end walls 10 of the casing. Each of the rods 12, 13, has a laterally extending boss 15 and these bosses house spring pressed plungers 16 which, in turn engage balls 17, the latter being adapted to engage and seat in spherical depressions 18 formed in the supporting bars 14.

Each of the shiftable elements has also formed thereon or secured thereto a depending gear shifting yoke or arm 19. The arms 19 engage, in a well known manner, the shiftable gears of the transmission mechanism.

In order to prevent the simultaneous shifting of both tubular rods 12, 13, a reciprocable plunger 20 is slidably mounted in a supporting member 21, carried by one of the end walls of the gear casing, the member 20 being adapted to engage notches 22 formed in the elements 12, 13. The member 20 is made of sufficient length to permit one of the elements 12, 13 to be shifted longitudinally but the engagement of the outer surface of the shifted element with the corresponding end of the member 20 forces the opposite end of this member into the notch 22 of the other element adjacent said end to such an extent that the longitudinal shifting of that element is prevented.

The elements 12 and 13 are shifted in the present instance by means of a shifting lever 23 of the usual construction, the lower end 24 of this lever being adapted to engage notches 25 formed on the elements 12, 13.

Figure 3:
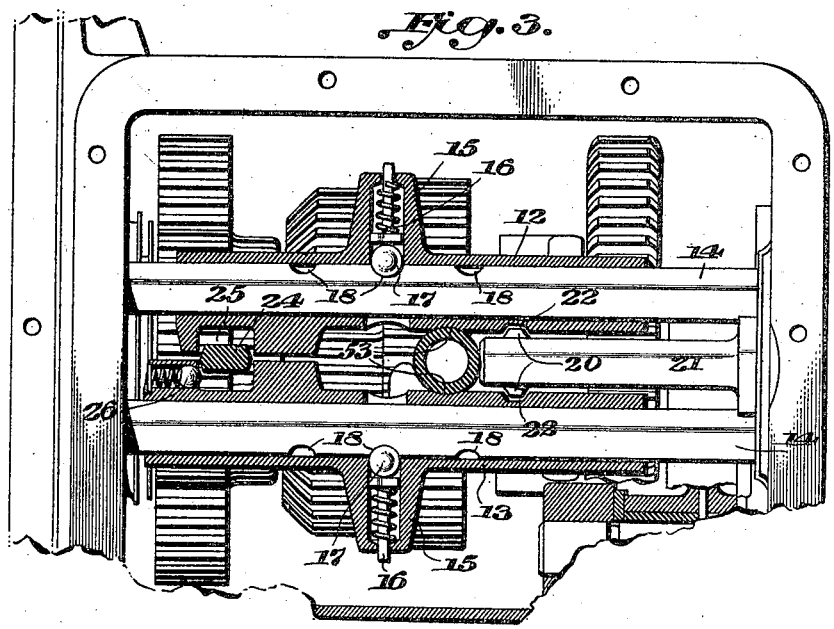
Fig. 3 is a horizontal sectional view showing the locking member engaged with the shiftable elements.

In Fig. 3, the lower end 24 of the lever is shown in neutral position. The member 13, as shown in Fig. 3, is provided with a spring pressed ball 26, which is adapted to engage end 24 of the lever when the lever is shifted to a position in engagement with the notch 25 of the member 13, thereby preventing the lever from rattling when the motor is running and the vehicle is being propelled.

The construction above described is common in motor vehicles and it should be understood that the locking mechanism which will next be described is equally well adapted for use in connection with other types of shifting mechanism, the form illustrated being shown merely for the purpose of disclosing one practical embodiment of the invention.

Referring particularly to Fig. 1, it will be noted that the cover 11 of the gear casing is provided with an upwardly extending bracket or casing 27, this bracket housing a tubular casing or sleeve 28, in which the locking mechanism is mounted.

The locking mechanism comprises a vertically reciprocable locking bolt 29, which projects downwardly through an aperture 30 formed in the lower end of the casing 28. The upper end of the bolt 29 is enlarged as shown at 31 and is provided with a laterally extending flange 32 positioned intermediate the upper end 31 and the lower end of the bolt.

In order to prevent the removal of the bolt 29 and also to prevent the bolt from turning in the casing 28, a dowel 32' is carried by the upper end of the casing 28 and engages a longitudinally extending recess 33 formed in the upper end 31 of the locking bolt. The portion 31 of the bolt has formed therein a transversely extending bore in which is slidably mounted a latch member 34, shown in detail in Figs. 5 to 7, inclusive. The member 34 is substantially cylindrical in shape and is provided with longitudinal recess 35, which houses an actuating spring 36, one end of this spring engaging the end wall of the recess and the opposite end engaging the inner wall of the bolt casing 28. On its upper surface the latch has formed an oblong recess or slot 37 and on its lower surface there is formed a projection 38.

In Figs. 1 and 2 the locking mechanism is shown in its unlocked position and the bolt 29 is held in this position by means of a coil spring 39, which engages the enlarged upper end 31 of the bolt, at one end of the spring, and the lower end 40 of the casing 28, at its other end. In the embodiment of the invention illustrated, the lower portion of the casing 28 is formed separately and the aperture 30 above described is formed in this separate portion of the casing, this portion being formed as a cap which is bolted as shown at 41 to the upper portion of the casing, these bolts 41 passing thru a part of the upper portion of the casing 28 and securing the casing to the cover 11 so that it may be removed only from the inside of the cover.

The flange 32 which, as above described, is formed on bolt 29 constitutes a stop for limiting the upward movement of the bolt under the influence of the spring 39, the flange engaging the lower end of a bushing 42 which is positioned in a recess 43 formed in the casing 28. The projecting portion 38 of the latch 34 engages, in its unlocked position, the bushing 42 just described, this construction being shown in Fig. 1.

In order to retract the latch 34 after the locking mechanism has been placed in operative position, I have provided a barrel type of lock comprising a barrel 44 positioned in the upper end of the bolt 29 which is recessed for this purpose, the barrel 44 having a downwardly extending eccentrically positioned projecting portion 45, as shown in Figs. 1 and 4.

The portion 45 of the locking barrel 44 is positioned in the recess 37, formed in the upper surface of the latch 34 and as the barrel 44 is rotated by means of a suitable key, the portion 45 will engage the latch and will retract the latch from its locking position, shown in Fig. 4.

In order to inclose the locking barrel 44 and to form a suitable means for engagement by the operator in actuating the mechanism, a cap 46 is hinged, as shown at 47, to a bracket 48 carried by the upper end of the bolt 29. This cap is adapted to be held in closed or open position by means of the engagement of spring pressed ball 49 with a suitable cam portion 50 formed on bracket 48, a spring 51, for actuating the ball, being housed in a recess 52 formed in the cap.

The lower end of the locking bolt 29 engages recesses 53 formed on the inner surfaces of the shiftable elements 12 and 13, when these elements are in neutral position and by engaging these recesses, the bolt prevents the longitudinal shifting of these elements.

In Figs. 1 and 2, the locking mechanism is shown in inoperative position with the latch 34 retracted and engaging the inner surface of the bushing 42. In order to actuate the locking mechanism, the cap 46 will be closed and the operator will press downwardly upon this cap and thereby force the bolt or plunger 29 against the tension of the spring 39 into a position in which the lower end of the bolt engages the recesses 53 formed in the shiftable elements 12 and 13.

When the bolt has been forced to this position, the latch 34 will be automatically pressed outwardly by the spring 36 to a position in which the lower projecting portion 38 will project laterally and will engage the lower surface of the bushing 42 or a portion of the bolt casing 28. The latch thus retains the locking bolt in its locking position until the latch is retracted by rotating the barrel 44 with a suitable key. As the barrel is rotated, the lower projecting end 45 thereof will engage the end wall of the slot or recess 37 formed in the latch and will retract the latch from the lower end of the bushing, and the spring 39 will force the bolt upwardly to its unlocked position releasing the shiftable elements.

It will be obvious that the locking mechanism above described may be located at any convenient point relative to the motor vehicle frame structure and need not necessarily be positioned adjacent to the shifting lever as illustrated. It will also be understood that inasmuch as the locking mechanism is entirely distinct and separate from the gear shifting lever, that this mechanism may be used in connection with other forms of shifting levers and is capable of general application.

While one specific embodiment of the invention has been illustrated and described, it will be understood that changes and modifications may be made in the construction and in the arrangement of the various elements without departing from the scope of the invention, as expressed in the following claims.

Having described my invention, what I claim and desire to secure by Letters Patent is:—

1. In combination, a gear casing, shiftable elements mounted therein, locking means for said shiftable elements carried by said casing and comprising a casing, a reciprocable plunger carried by said casing, and adapted to engage said shiftable elements, automatically operable means for retaining said plunger in locked position, a lock member for retracting said last named means and a cover carried by said plunger and adapted to actuate the plunger and inclose said lock member.

2. In combination, a gear casing, shiftable elements mounted therein, locking means for said shiftable elements carried by said casing and comprising a casing, a reciprocable plunger carried by said casing and adapted to engage said shiftable elements, automatically operable means for retaining said plunger in locked position, a lock member for retracting said last named means, and a cover pivotally connected to the plunger and adapted to actuate said plunger and to inclose said lock member.

3. In a gear shifting mechanism, the combination with a plurality of longitudinally shiftable rods, of locking means therefor, comprising a two-part sleeve, a locking bolt mounted in the sleeve, means for locking and unlocking said bolt, and means securing the parts of the sleeve together and to the casing.

4. In a gear shifting mechanism, the combination with a gear casing and a plurality of shiftable members, of a locking device for said members comprising a sleeve mounted in said gear casing, a cap member therefor detachable therefrom, and means accessible from the inside of said casing only, connecting said sleeve, cap and casing.

5. In a gear shifting mechanism, the combination with a gear casing, of a locking device for the gear shifting members comprising a two-part sleeve and means for securing the parts of said sleeve together and to the gear casing.

In testimony whereof I affix my signature.

ARA GILSON.